United States Patent [19]

Kruschwitz

[11] 4,147,006
[45] Apr. 3, 1979

[54] WINDOWS

[75] Inventor: Werner Kruschwitz, Viersen, Fed. Rep. of Germany

[73] Assignee: Draftex Development AG, Switzerland

[21] Appl. No.: 867,218

[22] Filed: Jan. 6, 1978

[30] Foreign Application Priority Data

Jan. 19, 1977 [GB] United Kingdom ............... 2192/77

[51] Int. Cl.² .......................... B60J 1/02; E04C 2/38
[52] U.S. Cl. ........................................ 52/401; 52/717
[58] Field of Search ............... 52/208, 400, 401, 397, 52/717, 718; 49/441, 491

[56] References Cited

U.S. PATENT DOCUMENTS

| 3,245,182 | 4/1966 | Zierold | 52/208 |
| 3,744,201 | 7/1973 | Dochnahl | 52/400 |
| 3,851,433 | 12/1974 | Colucci | 52/401 |
| 4,007,536 | 2/1977 | Soderberg | 52/400 |

Primary Examiner—J. Karl Bell

Attorney, Agent, or Firm—Leydig, Voit, Osann, Mayer & Holt, Ltd.

[57] ABSTRACT

An arrangement for sealing and retaining a window glass (such as a motor vehicle windshield) in an opening is disclosed for use where the window opening has a surrounding flange directed inwardly of the opening. A series of U-shaped metal clips are placed onto the flange at intervals. Each clip additionally has at least two arms which project outwardly of the opening from near to the free edge of one leg of each clip, the arms of each clip being provided with teeth and together defining a mouth. A continuous channel-shaped flexible strip structure is then placed over the U-shaped clips and the flange between the clips, but so as to leave the projecting arms clear. The strip structure includes two outwardly projecting sealing lips, against which the window glass seats. A beading, of T-shape in cross-section, is then placed around the entire periphery of the window glass, with the leg of the T extending into the mouths provided by the projecting arms on each clip and locking with the teeth therein. The beading serves a decorative, sealing and retaining function.

10 Claims, 6 Drawing Figures

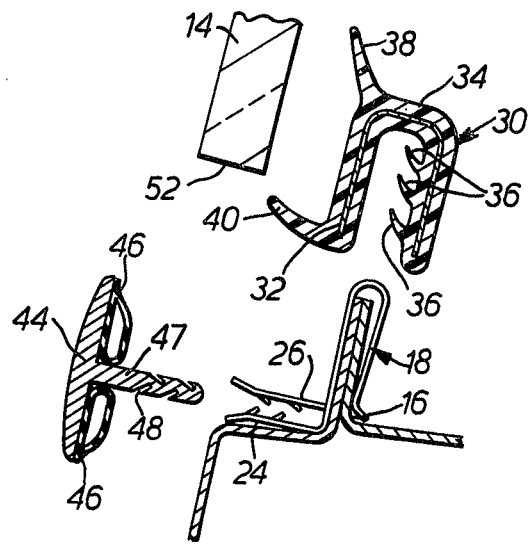
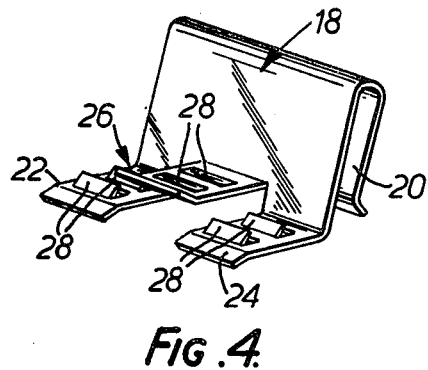
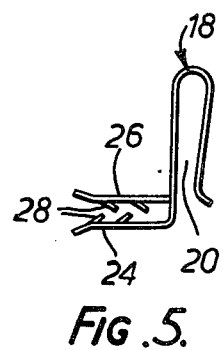
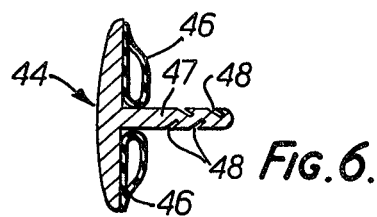
FIG. 3.
FIG. 4. FIG. 5.
FIG. 6.

WINDOWS

BACKGROUND OF THE INVENTION

The invention relates to windows and more particularly to methods and means for sealing and retaining glass (which term is used herein to include like transparent or translucent media) in window openings such as, for example, window openings in vehicle bodies, particularly windscreen or windshield openings.

In fixing a window glass in an opening, it is necessary for the fixing arrangement to be simple and quick to use, to provide an effective weatherproof seal, and to provide secure retention of the window glass. These requirements are particularly important in fixing arrangements for fixing glass in a windshield opening in a motor vehicle body; and in that application it is especially important that the fixing arrangement provides secure retention of the glass so as to hold it in position even when struck forcibly by, for example, an occupant of the vehicle in the event of a crash. In fact, such a requirement is not only important but is required by official regulations.

However, it will be appreciated that any fixing arrangement, while securely retaining the glass in position, should also be such as to be easy to use so as both to minimise production costs and to ease replacement of the window glass in case of breakage. Furthermore, it should provide a proper seal and be pleasing in appearance.

A sealing and retaining arrangement for retaining glass in a windshield opening is known in which the glass is primarily held in position by means of a layer of adhesive between the glass and a flange around the opening. In addition, clips are placed at intervals around the window opening and mounted on the flange, these clips having extensions direction both inwardly and outwardly of the window opening, and these extensions hold decorative moldings. Although the clips may also, in this application, help to support the glass in position during the bonding operation, primarily they are intended merely for supporting the decorative moulding.

It is an object of the invention to provide an improved sealing and retaining arrangement for sealing and retaining a window glass in position in a window opening.

BRIEF SUMMARY OF THE INVENTION

According to the invention, there is provided a sealing and retaining arrangement for sealing and retaining a window glass in a window opening having a flange running therearound, comprising support means for mounting on the flange to provide projection means along the length of the flange and projecting outwardly of the opening and carrying locking means, a channel-shaped strip structure for embracing the flange and the said support means but not the projection means thereof and carrying a sealing part on its outside surface such that when the strip structure is in position on the flange and the said support means, the sealing part extends along the complete length of the flange and is directed outwardly of the said opening, and a retaining member for extending around the said opening and having a first part for making contact with the outside surface of a window glass when the latter is placed in position in the opening against the sealing part of the strip structure and a second part arranged to mechanically lock with the locking means of the projection means so as positively to hold the retaining member in position.

DESCRIPTION OF THE DRAWINGS

Methods according to the invention, and arrangements embodying the invention, for sealing and retaining a windscreen glass in the windscreen opening of a motor vehicle body, will now be described by way of example only and with reference to the accompanying diagrammatic drawings in which:

FIG. 3 is an exploded diagrammatic view of the windscreen sealing and retaining arrangement of FIG. 2;

FIG. 4 is a perspective view of a clip used in the windscreen sealing and retaining arrangement of FIG. 2;

FIG. 5 is an end elevation of the clip of FIG. 4; and

FIG. 6 is a cross-sectional view of beading used in the windscreen sealing and retaining arrangement.

DESCRIPTION OF PREFERRED EMBODIMENTS

Figure 1:
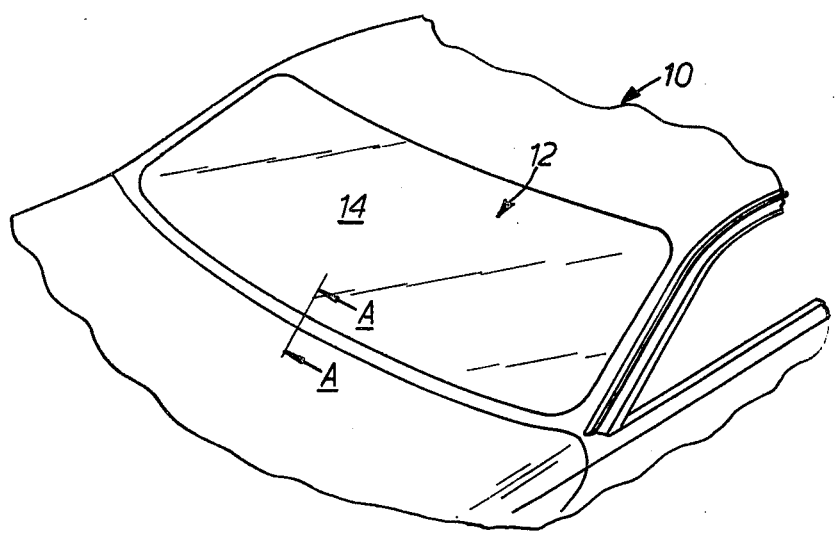
FIG. 1 is a part perspective view of a motor vehicle body showing the windscreen and window opening thereof.

As shown in FIG. 1, a motor vehicle body shown generally at 10 has a windscreen opening 12 in which is mounted window glass 14.

Figure 2:
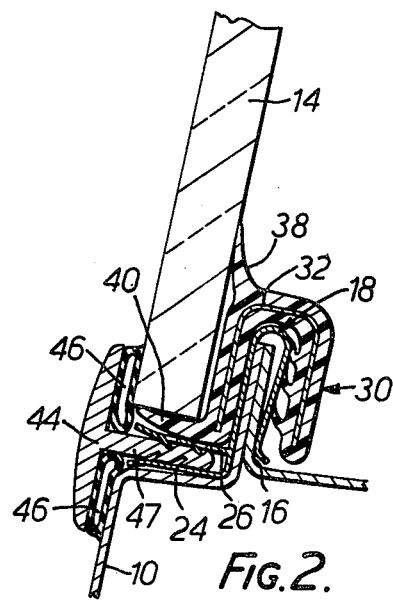
FIG. 2 is a section on the line A—A of FIG. 1 showing one of the windscreen sealing and retaining arrangements.

As shown in FIG. 2, the portion of the vehicle body 10 surrounding the opening 12 is arranged to provide a flange 16 which runs around the opening and is directed towards the centre of the opening so as to lie in the general plane of the opening.

The windscreen sealing and retaining arrangement to be described includes a number of metal clips 18 (see particularly FIG. 4). Each clip 18 has a channel-shaped part 20 which is arranged to be clipped over the flange 16, and three arms 22, 24 and 26 which protrude from one side of the channel-shaped part 20, the arm 26 being placed above the arms 22 and 24. As shown in FIGS. 3 and 5, the arms 22, 24 and 26 are provided with tangs 28, with the tangs 28 on the arms 22 and 24 being directed towards the arms 26 and the tangs on the latter arm being directed towards the arms 22 and 24.

The clips 18 are fitted to the flange at suitable intervals around the entire windscreen opening.

The windscreen sealing and retaining arrangement also includes a channel-shaped strip structure 30 (FIGS. 2 and 3). This strip structure may be of any suitable form and may, for example, be of the general form disclosed in our British Pat. No. 1015728. It comprises a channel-shaped metal carrier 32 which is embedded in plastics or rubber material 34, such as by an extrusion process. On the inside of the channel, the strip structure 30 may include a plurality of gripping ribs 36 each running along the length of the strip, three such gripping ribs being illustrated merely by way of example; there may be more or less ribs, or none at all, and there can be ribs on each side of the channel, not necessarily the same in number.

Externally of the channel, the strip structure 30 includes sealing lips 38 and 40. These sealing lips are preferably made of rubber, such as Neoprene sponge rubber.

If the coating material 34 is rubber, then this material, together with the material of the gripping ribs 36 and the sealing lips 38 and 40, may be formed by a suitable extrusion process such as, if desired, to provide the different parts with different, and suitable, hardnesses. For example, the coating material 34 may be relatively hard and the gripping ribs 36 relatively softer, with the sealing lips 38 and 40 different again by being spongy or foamed. However, any other suitable combination of rubber may be used. Also possible is an arrangement in which the coating material 34 is plastics material such as polyvinylchloride. In such a case, the sealing lips 38, 40 may also be of plastics material. Preferably, however, they would still be of rubber, such as Neoprene sponge rubber, and would be stuck or otherwise attached to the plastics material 34.

The windscreen and sealing retaining arrangement also includes beading 44 which is T-shaped in cross-section. The beading 44 is preferably made of metal, such as aluminium, and may be pre-formed to the shape of the surround of the windscreen opening 12. On the underside of the head of the T, it incorporates seals 46, such as made of rubber, running along the length of the beading. The leg 47 of the T incorporates a plurality of longitudinally extending grooves 48.

In use, the clips 18 are fitted onto the flange 16 at suitable intervals around the entire length of the flange as shown in FIG. 3, so that the arms 22, 24 and 26 are directed outwardly of the windscreen opening. The channel-shaped strip structure 30 is then pressed onto the flange 16, so as to embrace it and the clips 18, around the entire windscreen opening, with the sealing lips 38 and 40 directed outwardly of the windscreen opening and with the arms 22, 24 and 26 of the clips 18 projecting clear of the strip structure 30. The gripping ribs 36, if such be provided, seal against the sides of the clips 18 and the flange 16.

The windscreen glass 14 is then placed in position as shown in FIG. 2, with the periphery 52 of the windscreen seating on the sealing lip 40 around the entire windscreen opening and with the sealing lip 38 pressing against the inside surface of the window glass.

Finally, the beading 44 is pressed into position by inserting the leg of its T-section into the spaces on the clips 18 between the arms 22 and 24 on the one hand and the arm 26 on the other hand. During this process, the locking tangs 28 on the warms 22, 24 and 26 of the clips 18 engage the grooves 48 in the leg of the beading 44. The seal 46 on the beading 44 presses against the outside surface of the window glass, and the engagement of the tangs 28 with the grooves 48 causes the beading 44 to hold the windscreen glass firmly in position.

The windscreen glass itself, by seating on the sealing lip 40, firmly holds the strip structure 30 in position around the entire windscreen opening.

A very important advantage of the windscreen sealing and retaining arrangement dsecribed is that it firmly resists or prevents the windscreen glass 14 being pushed out of the windscreen opening if struck, as during an accident to the vehicle, by a thrown-forward occupant of the vehicle. In this way, the occupant is retained within the vehicle, and the arrangement described can be constructed to meet the relevant United States Federal automobile safety regulations in this respect.

The arrangement disclosed is also advantageous in that there is only a minimum of sealing material visible from externally of the vehicle around the windscreen opening. The strip structure 30 can be coloured, using known methods, so as to match the colour of other like strip structures used in other parts of the vehicle body, such as around its door or other window openings.

The use of Neoprene or similar sponge rubber for the sealing lips 38 and 40 is advantageous in providing a very effective weather seal.

The arrangement is also advantageous in that it enables windscreen glass to be fitted to a windscreen opening in a simpler fashion and with less expenditure of time than other windscreen sealing and retaining arrangements.

The arrangements described are not restricted to use in relation to windscreens in vehicles but may be used to retain window glass in other openings in vehicles or in window openings in other applications.

What is claimed is:

1. A sealing and retaining arrangement for sealing and retaining a window glass in a window opening having a flange running therearound, comprising
   channel-shaped resilient metal support means embracing the flange,
   projection means integral with the support means and projecting outwardly of the window opening at least at intervals along the length of the flange, the projection means carrying locking means,
   a flexible channel-shaped strip structure comprising flexible material and sized in length to match the length of the periphery of the window opening and sized in cross-section to embrace the flange and the channel-shaped part of the said support means but not the projection means of the support means,
   a sealing part on the outside surface of the strip structure and positioned thereon to extend along the complete length of the flange and to be directed outwardly of the opening, and shaped to define a seat for receiving the peripheral edge of the window glass and the surface thereof on the inside of the window opening,
   a window glass in the opening and seated in and on the said seat of the sealing part of the strip structure, and
   a retaining member sized to extend around the said opening, the retaining member defining a first part which contacts the outside surface of the window glass in position on the opening, and a second part mechanically locking with the locking means on the projection means so as positively to hold the retaining member in position and thereby to hold the window glass in position.

2. An arrangement according to claim 1, in which the said support means comprises a plurality of clips mounted at intervals along the length of the flange, each clip defining a U-shaped part sized to embrace the flange and at least one arm projecting outwardly from the side of one leg of the U, the arms of the clips together forming the projection means.

3. An arrangement according to claim 2, in which each clip has a plurality of the projecting arms.

4. An arrangement according to claim 3, in which the arms of each clip are spaced apart from each other so as to define a mouth in which is received the said second part of the retaining member.

5. An arrangement according to claim 1, in which the locking means comprises interrupted surface formations on the projection means.

6. An arrangement according to claim 1, in which the retaining member is T-shaped in cross-section with part of the head of the T comprising the first part of the member and the leg of the T the second part.

7. An arrangement according to claim 6, in which the underside of the head of the T carries sealing means sealing against the outside of the window glass.

8. An arrangement according to claim 5, in which the retaining member comprises a member which is T-shaped in cross-section with part of the head of the T comprising the first part of the member and the leg of the T the second part, the leg of the T carrying interrupted surface formations which engage the interrupted surface formations on the projection means of the said clips.

9. An arrangement according to claim 1, in which the sealing part of the strip structure comprises two sealing lips running along the length of the strip structure and made of relatively soft flexible sealing material, one of them being positioned to engage the peripheral edge of the window glass and to define the said seat and the other to engage the surface thereof on the inside of the window opening.

10. A sealing and retaining arrangement for sealing and retaining a window glass in a window opening having a flange which runs around the opening and lies in the general plane of the opening, comprising a series of metal clips mounted at spaced apart intervals on the flange around the opening, each clip having a part of channel-shaped cross-section which embraces the flange and a plurality of arms projecting sideways from one outside surface of the channel-shaped part and outwardly of the said window opening and spaced at different distances from the mouth of the channel-shaped part with their facing surfaces defining locking profiles, a channel-shaped strip structure mounted on the flange and over the clips thereon and sized in length to match the periphery of the window opening and sized in cross-section to embrace the flange and the channel-shaped parts of the metal clips, the strip structure and the clips being sized and shaped so that the arms of the clips project clear of the strip structure, the strip structure incorporating a channel-shaped metal core covered in soft flexible polymeric material and defining two sealing lips of soft flexible material projecting from the outside surface of one wall of the channel of the strip structure so as to be directed outwardly of the said window opening, one said sealing lip being positioned adjacent the distal edge of that wall of the channel of the strip structure so as to define, with the outside surface of that wall, a seat for receiving a peripheral edge of the window glass, and the other said sealing lip being positioned adjacent the base of the channel of the strip structure and angled so as to press against the surface of the window glass inwardly of the peripheral edge thereof, and beading having a T-shaped cross-section and sized in length to match the periphery of the window opening, the leg of the T defining locking means and projecting between the projecting arms of each said clip with the locking means locking with the locking profiles on the said arms so as to hold the beading in position with at least part of the underside of the T of the beading resting against the window glass when seated in the window opening on the said seat provided by the first sealing lip of the channel-shaped strip structure, the beading providing substantially the sole means of securing the window glass in the opening.

* * * * *